United States Patent [19]

Hall

[11] Patent Number: 4,700,579
[45] Date of Patent: Oct. 20, 1987

[54] DIGITAL FLOW METER FOR DISPENSING FLUIDS

[75] Inventor: Robert E. Hall, Wichita, Kans.

[73] Assignee: Great Plains Industries, Inc., KS

[21] Appl. No.: 826,297

[22] Filed: Feb. 5, 1986

Related U.S. Application Data

[63] Continuation-in-part of Ser. No. 553,793, Nov. 21, 1983.

[51] Int. Cl.⁴ .............................................. G01F 1/115
[52] U.S. Cl. .............................. 73/861.78; 73/861.92; 416/242
[58] Field of Search ..................... 73/861.78, 861.79, 861.89–861.94; 416/242, 243

[56] References Cited

U.S. PATENT DOCUMENTS

| | | | |
|---|---|---|---|
| 2,524,870 | 10/1950 | Adamtchick | 416/243 |
| 2,770,131 | 11/1956 | Sparling | 73/861.94 |
| 3,238,776 | 3/1966 | Potter | 73/861.91 |
| 3,529,631 | 9/1970 | Riollet | 416/243 |
| 3,623,835 | 11/1971 | Boyd | 73/861.89 |
| 3,686,948 | 8/1972 | Lahaye | 73/861.63 |
| 4,073,601 | 2/1978 | Kress | 416/242 |
| 4,114,440 | 9/1978 | Stapler | 73/861.92 |

Primary Examiner—Herbert Goldstein
Attorney, Agent, or Firm—Bill D. McCarthy

[57] ABSTRACT

A flow meter mounted in a flow delivery line and having a meter housing with a fluid opening and an electric counter. A turbine rotor supported on a turbine shaft is disposed in the fluid opening, the turbine having plural turbine blades with ferrous slugs embedded therein, the electric counter responding thereto for fluid delivery indication. Each turbine blade is tapered from front to rear into a feathered trailing edge and has a top concave surface along its length and a bottom convex surface. A pair of shaft supports, having fluid ports for washing about the turbine shaft, are provided to support the turbine rotor.

1 Claim, 9 Drawing Figures

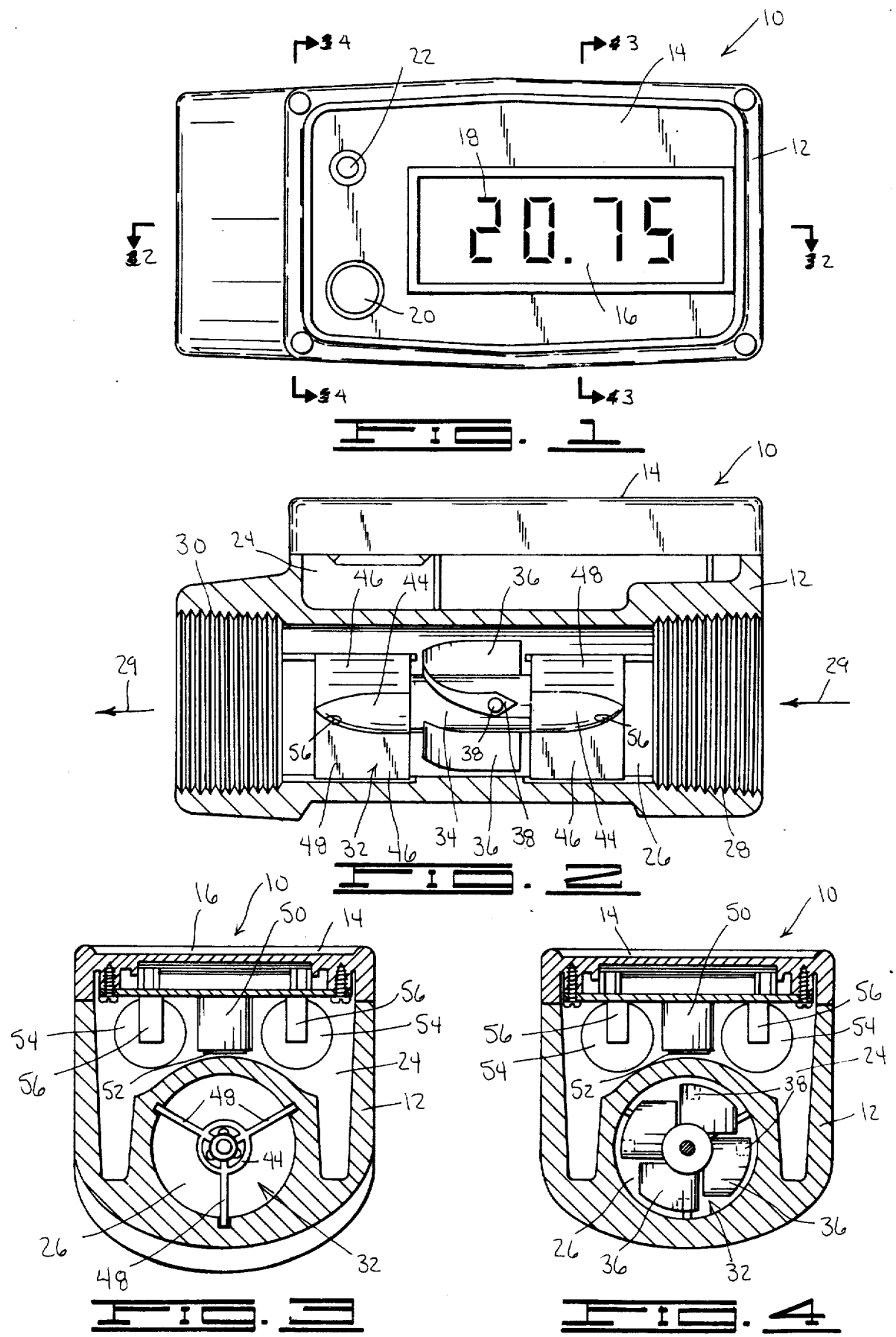

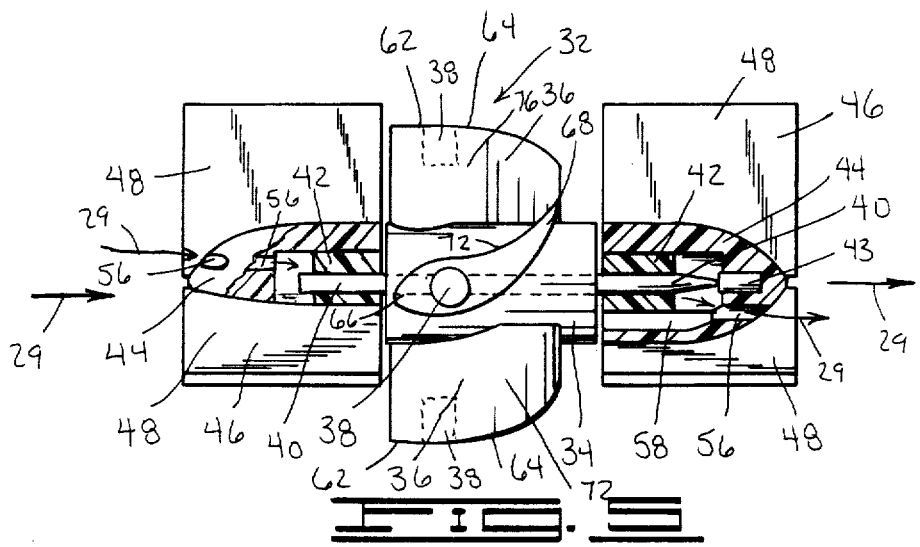
FIG. 5
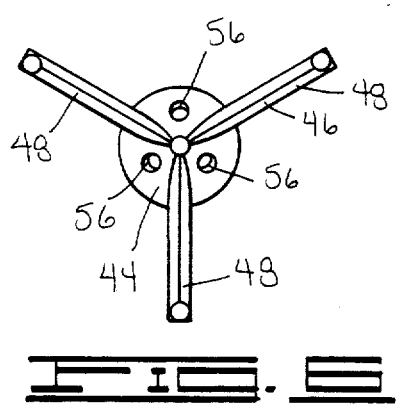
FIG. 6
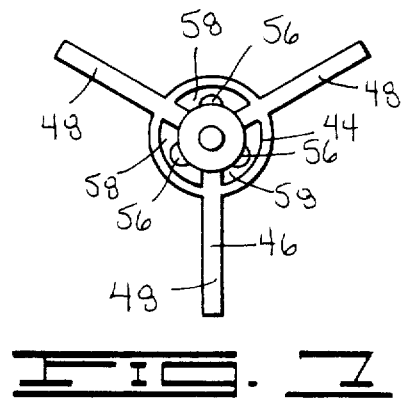
FIG. 7
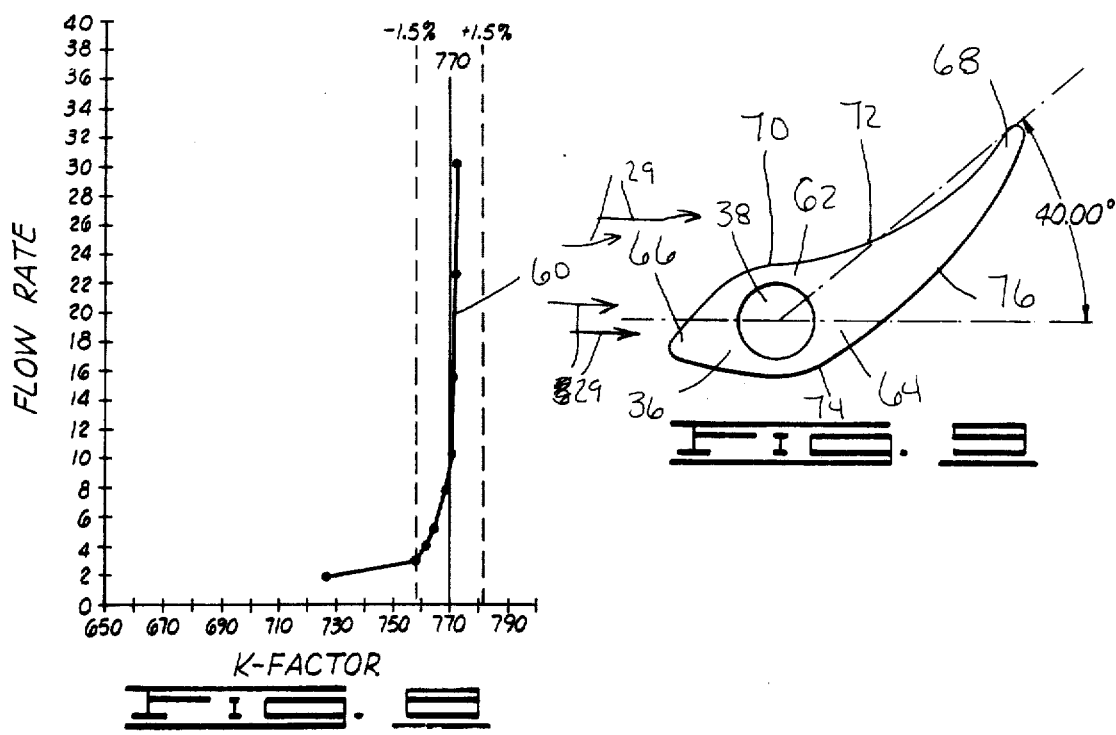
FIG. 8
FIG. 3

DIGITAL FLOW METER FOR DISPENSING FLUIDS

BACKGROUND OF THE INVENTION

This application is a continuation-in-part of my application having the same title and filed on Nov. 21, 1983 having Ser. No. 553,793, now abandoned.

The invention relates to a fluid flow meter and more particularly, but not by way of limitation, to a battery operated digital flow meter used for mounting in a fluid delivery line for dispensing fluids of various viscosities.

Heretofore, the size and complexity of fluid flow meters precluded the use of a flow meter which could be used and read at the point of delivery when the fluid is being dispensed. Further flow meters with normal turbine blades use a flat profile of machined metal which is expensive. Also, the high cost of the existing self-contained battery powered equipment limited this type of equipment for use by the average consumer. In the past there have been various types of flow meters with different types of read-out counters. These types of flow meters are disclosed in the following United States Patents: U.S. Pat. Nos. 3,329,021 to Quesinberry et al, 3,370,465 to Belle, 3,774,448 to Gass et al, 3,823,310 to Kalotay et al and 4,265,127 to Onoda, 128,338 to Van Anden, 3,084,545 to Waugh, 3,238,776 to Potter, 3,757,578 to Clinton, 3,452,593 to Lauter, 3,534,602 to Boyd, 3,623,835 to Boyd, 3,945,253 to Liu et al and 4,253,341 to Ineda et al. None of the above-mentioned patents specifically disclose the unique structure and advantages of the subject digital flow meter as described herein.

SUMMARY OF THE INVENTION

The subject digital flow meter for dispensing fluids is a combination of a turbine type flow meter with a battery powered digital counter with a liquid crystal display which meets the user's needs in dispensing different types of fluids. The flow meter uses pulse sensing which does not draw current thus allowing extended battery life up to seven years. Also, the meter has self-shutdown capability to further conserve the battery's energy. The turbine type design with solid state electronics allows for compact portable packaging.

A 4-digit, 0.5" high LCD display on the flow meter shows the volume of fluids that has passed through the turbine since the counter was reset. The display is capable of receiving a high resolution signal, i.e. 770 pulses per gallon.

Further, the counter may be reset to zero by simply depressing a reset switch for three seconds. Also depressing the reset switch momentarily will display a total cumulative count dispensed which is lost only when power is lost or removed.

In addition the counter has three methods of calibration which allow the use of fluids having different viscosities and may be calibrated in most any unit, i.e. gallons, liters, cubic feet, etc. A built-in calibration allows for low viscosity liquids, i.e. gasoline, diesel fuel, water, with an error of plus or minus 1½. A two point calibration allows the meter to be used for high viscosity liquids including viscous fluids such as oils and herbicides with an error within plus or minus 1%.

An additional advantage of the digital flow meter is that it may be mounted at the nozzle in the end of the delivery hose where it may be easily read by the operator. By placing the flow meter at the delivery end of the hose, the volume of fluid which ordinarily would be in the hose if the flow meter were mounted at the supply end of the hose is eliminated.

The simple calibration procedures as mentioned above allow the invention to be used with a wide range of different types of fluids and at operating temperatures from −14 degrees F. to +140 degrees F. and stored at −22 degrees F. to +150 degrees F. Further the flow meter utilizes solid state CMOS electronic circuitry for low power consumption and reliability and a weatherproof enclosure.

The flow meter has a low pressure drop to minimize load on the pump and accommodates flow rates from 3 to 30 gallons per minute. Also the meter is adaptable for handling less than three gallons or greater than 30 gallons per minute. It is highly accurate and repeatable. The blades of the turbine have been designed for optimum performance based on a "K" factor (number of pulses per unit measure) over the meter's flow range. The turbine and blades are molded of plastic or other similar materials to greatly reduce the cost of the flow meter.

The shaft support of the turbine allows for flushing of the shaft and bearing areas to prevent accumulation of chemical residue which results in shaft "freeze-up".

The digital flow meter for mounting in a fluid delivery line for dispensing fluids of various viscosities includes a meter housing having a fluid opening therethrough. The opposite ends of the housing adjacent the opening are threaded for coupling to the delivery line. A turbine having turbine blades is mounted inside the opening. The turbine blades include ferrous slugs mounted therein. The turbine further includes a turbine shaft received in shaft supports which are attached to the sides of the opening. A pickup coil with magnet is mounted in a display cavity in the top of the housing. The magnet counts the magnetic pulses as the turbine blade rotates thereby. An electronic counter with digital display is connected to the pickup coil for converting the magnetic pulses to a readable count display on the digital counter.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates a top view of the digital flow meter housing.

FIG. 2 is a side sectional view of the flow meter taken along lines 2—2 shown in FIG. 1.

FIG. 3 is an end sectional view of the meter housing taken along lines 3—3 shown in FIG. 1.

FIG. 4 is an end sectional view of the meter housing taken along lines 4—4 shown in FIG. 1.

FIG. 5 illustrates the turbine mounted on a pair of stationary shaft supports.

FIGS. 6 and 7 illustrate a front and rear view of one of the stationary shaft supports.

FIG. 8 illustrates a plot of a "K" factor (pulses per unit measure) and flow rate (i.e. gpm).

FIG. 9 illustrates an enlarged view of the turbine blade profile.

DETAILED DESCRIPTION OF THE DRAWINGS

In FIG. 1 the digital flow meter is designated by general reference numeral 10. The digital flow meter includes a meter housing 12 having a display area 14 mounted in the top of the housing 12. In the display area 14 is a liquid crystal display 16 with a digital counter 18 displaying, for example, 20.75 gallons of fluid dispensed. Also shown in the top of the display area 14 is a display button 20 and a calibration button 22 connected to the digital counter 18.

In FIG. 2 a side sectional view of the housing 12 is shown taken along line 2—2 shown in FIG. 1. In this Fig. the housing 12 can be seen having a display cavity 24 for receiving the electronic counter controls therein. The meter housing 12 further includes a fluid opening 26 therethrough with opposite ends 28 and 30 threaded for coupling a delivery line. The direction of fluid flow is indicated by arrows 29.

A turbine designated by general reference numeral 32 is disposed inside the opening 26. The turbine 32 includes a turbine rotor 34 with a plurality of turbine blades 36 equally spaced around the turbine rotor 34 and extending outwardly therefrom. Mounted in the ends of the blades 36 are ferrous slugs 38. The turbine 32 further includes turbine shaft 40. The shaft 40 can be seen in FIG. 5. The turbine shaft 40 is mounted on support bearings 42 received in a pair of support bases 44. Each base 44 is part of a shaft support 46. The two shaft supports 46 include a plurality of support arms 48 extending outwardly from the support base 44 with the ends of the arms 48 attached to the sides of the opening 26.

In FIGS. 3 and 4, sectional end views of the meter housing 12 can be seen. As the turbine blades 36 rotate on the turbine shafts 40 in the opening 26, the ferrous slugs 38 move adjacent the outer periphery of the opening 26 and past a pickup coil 50 having a magnet 52 mounted in the end thereof. The pickup coil 50 converts the magnetic pulses received by the magnet 52 and converts the magnetic pulses to a readable count sent to a microprocessor which is part of the liquid crystal display 16. The above-mentioned electrical controls are powered by a pair of batteries 54 received in the display cavity 24 and secured therein by battery supports 56.

Referring now to FIG. 5, the shaft supports 46 can be seen with the support base 44 cut-away to expose fluid ports 57 therethrough. These ports 57 can be seen in a front view of the shaft support 46 seen in FIG. 6 and a rear view of the shaft support 46 seen in FIG. 7. The fluid ports 57 open into enlarged fluid cavities 58 at the rear of the support base 44 as the fluid is transmitted past the turbine 32. The fluid acts as a washing agent for washing around and beside the turbine shaft 40, a thrust bearing 43 and the moving parts of the turbine 32. Further when various types of corrosive fluids are used, a light viscosity washing fluid such as gasoline can be used later for cleaning the insides of the turbine 32 so the fluid meter 10 will be clean for future use in dispensing different types of fluids.

In the past, normal turbine blades have had a flat profile which is typically of machined metal construction. This type of construction is expensive. The subject turbine 32 has been molded using plastic material and the like with the normal flat profile of the turbine blades 36 modified to provide room for the metal slug 38 and improved turbine performance.

FIG. 8 illustrates how the unique shape and design of the turbine blades 36 influence the performance and accuracy of the amount of fluid delivered by the flow meter 10. It has been found that the shape of the blades 36 directly influence the "K" factor (pulses per unit measure) over a certain flow range. The vertical line in FIG. 8 shows flow rate from 0 to 40 gals. per minute. Ideally the "k" factor should be a vertical line when ploting the "k" factor vs. flow rate. But on a practical basis, the "k" factor curve shown as line 60 is not a vertical line and has some slope to it and at the low end the line 60 has a "knee" shape.

In FIG. 8 it can be appreciated that once the flow meter 10 has begun delivering fluid and at a volume greater than 2 gals. per minute, the pulses per unit measured are plus and minus 1.5% accurate within this example the pulses being approximately 770 per unit delivered. The straight line constant of the "k" factor helps insure accuracy in the amount of fluid delivered into a storage tank and the like.

As mentioned above the "k" factor is directly influenced by the design of the turbine blades 36. The shape of the blades as shown in FIG. 9 is not a true "turbine" which is commonly found with a flat profile. The subject turbine 32 is molded of plastic and similar materials with the blade 36 having an enlarged flatten area 62 in an end 64 of each blade for receiving the ferrous slug 38 therein. This structure can also be seen clearly in FIG. 5.

Each blade 36 includes a rounded leading edge 66 with the blade tapered from front to rear upwardly in the range of 40 degrees from the horizontal into a feathered trailing edge 68. A top 70 of the blade 36 has a concave surface 72 along the length of the blade. The concave surface 72 receives the force of the fluid thereagainst for driving the turbine 32 in a clockwise direction as shown in FIG. 5. A bottom 74 of the blade 36 has a convex surface 76 along the blades length. The blades 36 when viewed end to end have a hydrofoil type design.

In operation, the flow meter 10 incorporates a volumetric flow transducer which displays a digital output on the counter 18 directly proportional to the flow volume. Each digital pulse on the counter 18 represents a discrete volume which is scaled to a desired display increment.

When the battery power is first applied the unit is set by grounding an internal test point. An internal RAM and ROM check is performed and registers are initialized. If all checks are positive, the counter 18 shows 8.8.8.8. to verify all LCD segments. This display remains until the unit is RESET or until five minutes have elapsed since the last activity. At this time, the display counter 18 is cleared. Activity in the meter 10 is defined as pulse counts greater than 5 pulses per second.

During normal operation, 5 minutes after the last activity of the meter 10, the counter 18 clears and the units store the total cumulative volume since power was applied and the most recent volume since RESET of memory. The unit ignores and does not count or accumulate counts less than 5 pulses per second.

A count ratio, N, in pulses per gallon or any other desired volume measurement is computed for each fluid being transferred based on a calibration sequence performed by the operator. The count ratio is stored and used to compensate for varying flow rates by updating the display based on a linear relationship between frequency and flow rate. A count value N=770 PPG is utilized for the internal calibration sequence.

In calibrating the meter 10, three methods of calibration are provided. The first method of calibration allows the operator to calibrate the meter 10 to an internal standard which will have an error not to exceed + or −1½%. First the calibration button 22 is pressed and the display counter 18 shows CAL blinking. Then the calibration button 22 is pressed a second time within five minutes after the first calibration input. The unit will display 00.00. This procedure initializes the count ratio to N=770 PPG. This count ratio is then used to convert pulses to gallons for all operations until the next calibration sequence.

The second method of calibration is a single point calibration and is used when working with low viscosity fluids such as gasoline, diesel fuel and the like. The following calibration sequence may be used to reduce the error to within + or −½%. First the calibration button 22 is pressed to display "CAL" blinking. Then the fluid is dispensed into a container capable of holding 5 units of measure having a total volume of no less than 0.8 gallons. 5 units are then dispensed. As soon as pulses greater than 5 pulses per second are detected, the blinking CAL will stop blinking indicating the calibration mode is in process. When this is completed the operator waits 10 seconds but not more than 5 minutes. The CAL display will blink to indicate that 10 seconds have elapsed.

After this time, the CAL buttom 22 is pressed a second time after the display begins to blink. The display now indicates 00.00. The unit stores the count value and intializes to the count ratio, N, of the measured fluid and measures the count ratio to convert pulses to units for all operations until the next calibration sequence.

The last calibration method is a two point calibration used when working with high viscosity fluids such as oils, herbicides, molasses and the like with the following calibration sequence used to ensure an error within + or −1%. First the calibration button 22 is pressed and the display will show "CAL" blinking. Five units of fluid are dispensed into a container capable of indicating 5 units accurately. The CAL display will stop blinking as soon as fluid transfer starts. The operator then waits 10 seconds but not more than 5 minutes. The CAL display starts to blink to indicate that 10 seconds have passed. The operator then dispenses another 5 units of fluid at a different flow rate into a container capable of again indicating 5 units accurately. The CAL display will stop blinking as soon as the fluid transfer starts.

Ten seconds are then allowed to elapse but not more than 5 minutes. The CAL display will blink to indicate that 10 seconds have elapsed. The operator then presses the calibration button 22 a second time. The display counter 18 now indicates 00.00.

The meter 10 stores the count ratios N1 and N2 and initializes a linear calibration line between the two count ratios. The value of N varies with pulse rate and is updated once during each second during the pumping operation. The computed linear calibration line is then used to convert pulses to units for all operations until the next calibration sequence.

During normal pumping operations, the counter 18 shows the current volume of fluid pumped in units. Counts greater than 5 pulses per second are accumulated with the calibration count ratio applied and the display is updated twice per second. The decimal point shifts right to accomodate more significant digits to the left of the decimal up to a maximum reading of 9999.

The display counter 18 shows the most recent volume in units for five minutes after the last operation. After five minutes, without input and counts, the display goes blank, the final volume is stored and the unit goes into a standby mode to conserve the life of the batteries. The operator may return the unit to operational mode by momentarily, less than three seconds, pressing the display button 20. The counter 18 then shows the accumulative volume dispensed since power up from the first three seconds, then it shows the volume pumped since the last display zero reset. When the operator presses the display button 20 for longer than 3 seconds, the counter 18 shows the total accumulative volume pumped since power up during the first three seconds, then resets the counter 18 to 0 and a display of 00.00. Subsequent transfer of fluids results in new counts to the flow meter 10.

Changes may be made in the construction and arrangement of the parts or elements of the embodiments as described herein without departing from the spirit or scope of the invention defined in the following claims.

What is claimed is:

1. A flow meter for mounting in a fluid delivery line for dispensing fluids, the flow meter comprising;
    a meter housing having a display cavity disposed in the top thereof and a fluid opening therethrough, the opposite ends of the housing adjacent the fluid opening threaded for coupling to the delivery line;
    a turbine having a turbine rotor with a turbine shaft extending outwardly from the opposite ends of the turbine rotor, the turbine further having a plurality of turbine blades extending outwardly from the sides of the turbine rotor, each blade turbine having a ferrous slug embedded in an enlarged flattened area in the end thereof, the flattened area adjacent a rounded leading edge with the turbine blade tapered from front to rear into a feathered trailing edge, each turbine blade having a top concave surface along its length for receiving the force of the fluid there against and driving the turbine and a bottom convex surface along the its length, the turbine blades when viewed end to end having a hydrofoil type design;
    a pair of shaft supports, each of the shaft supports including a support base with a plurality of support arms extending outwardly therefrom, the ends of the support arms attached to the sides of the fluid opening, the support base having fluid ports therein and communicating with enlarged fluid cavities disposed so that fluid is washed around and beside the end of the shaft, the end of at least one of the turbine shafts engaging a thrust bearing mounted in the support base;
    a pickup coil with magnet mounted in the display cavity of the housing, the magnet disposed adjacent the outer periphery of the fluid opening for sensing magnetic pulses as the turbine blades with the ferrous slugs are rotated therepast; and
    electric counter means for converting the magnetic pulses to a readable count, and for displaying the readable count on a digital counter mounted in the top of the display cavity of the housing.

* * * * *

UNITED STATES PATENT AND TRADEMARK OFFICE
CERTIFICATE OF CORRECTION

PATENT NO. : 4,700,579

DATED : October 20, 1987

INVENTOR(S) : Robert E. Hall

It is certified that error appears in the above-identified patent and that said Letters Patent is hereby corrected as shown below:

In column 1, line 61, after the fraction "½" add --⅝--. In column 5, line 30, the word "buttom" should read --button--.

Signed and Sealed this

Twenty-eighth Day of June, 1988

Attest:

DONALD J. QUIGG

*Attesting Officer*  *Commissioner of Patents and Trademarks*